March 23, 1937.  G. M. BICUSA  2,074,533
MOTOR VEHICLE CHASSIS CONSTRUCTION
Filed Sept. 28, 1936   3 Sheets-Sheet 1
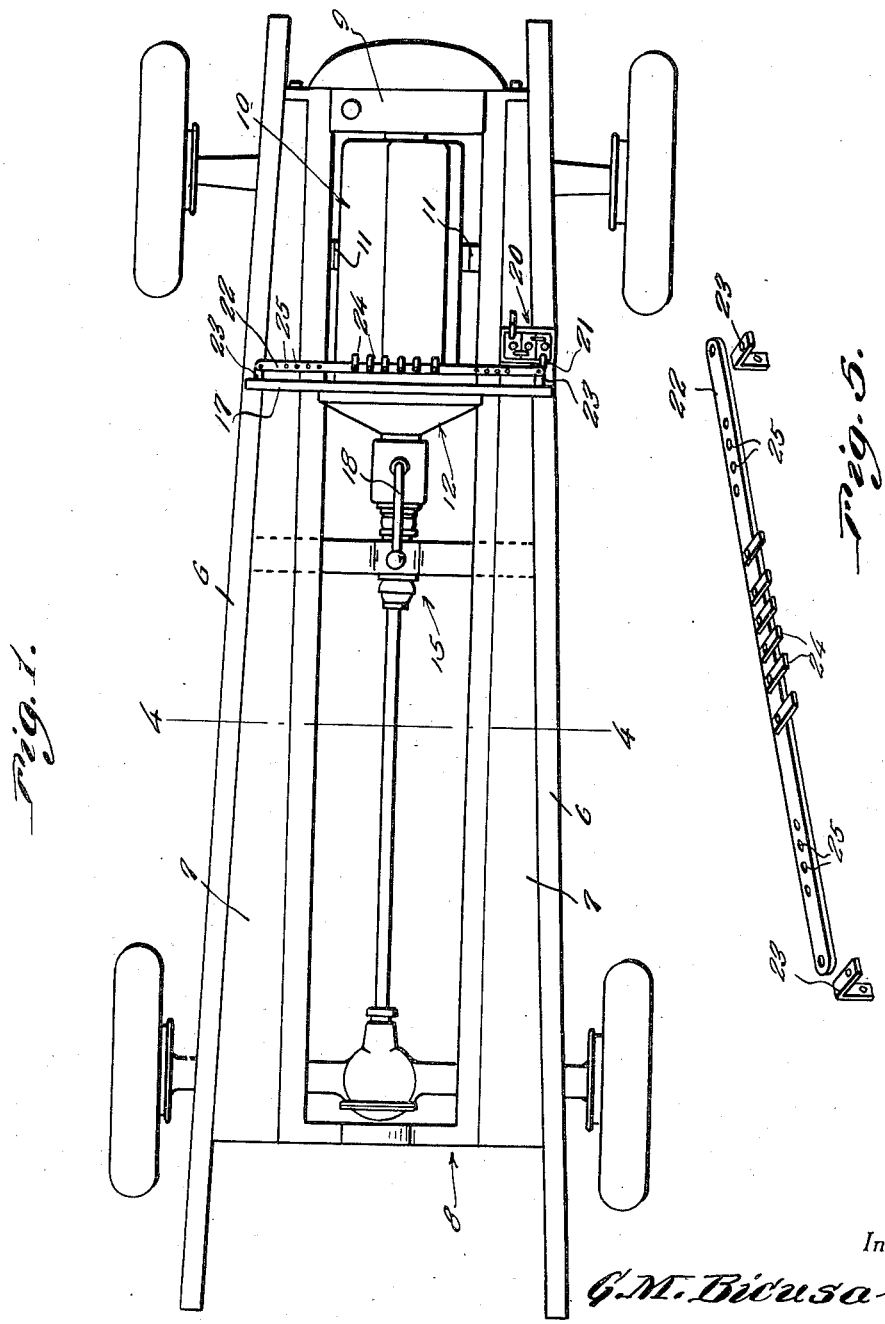
Inventor
G. M. Bicusa
By Clarence A. O'Brien
Hyman Berman
Attorneys

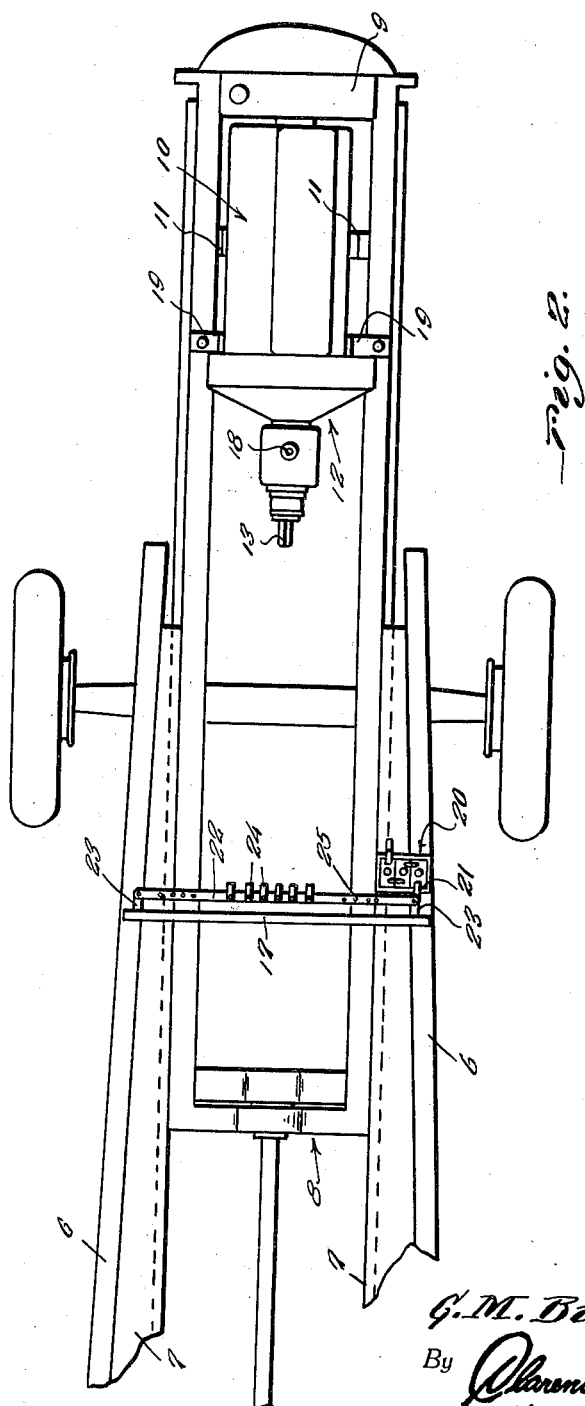

March 23, 1937.  G. M. BICUSA  2,074,533
MOTOR VEHICLE CHASSIS CONSTRUCTION
Filed Sept. 28, 1936  3 Sheets-Sheet 3
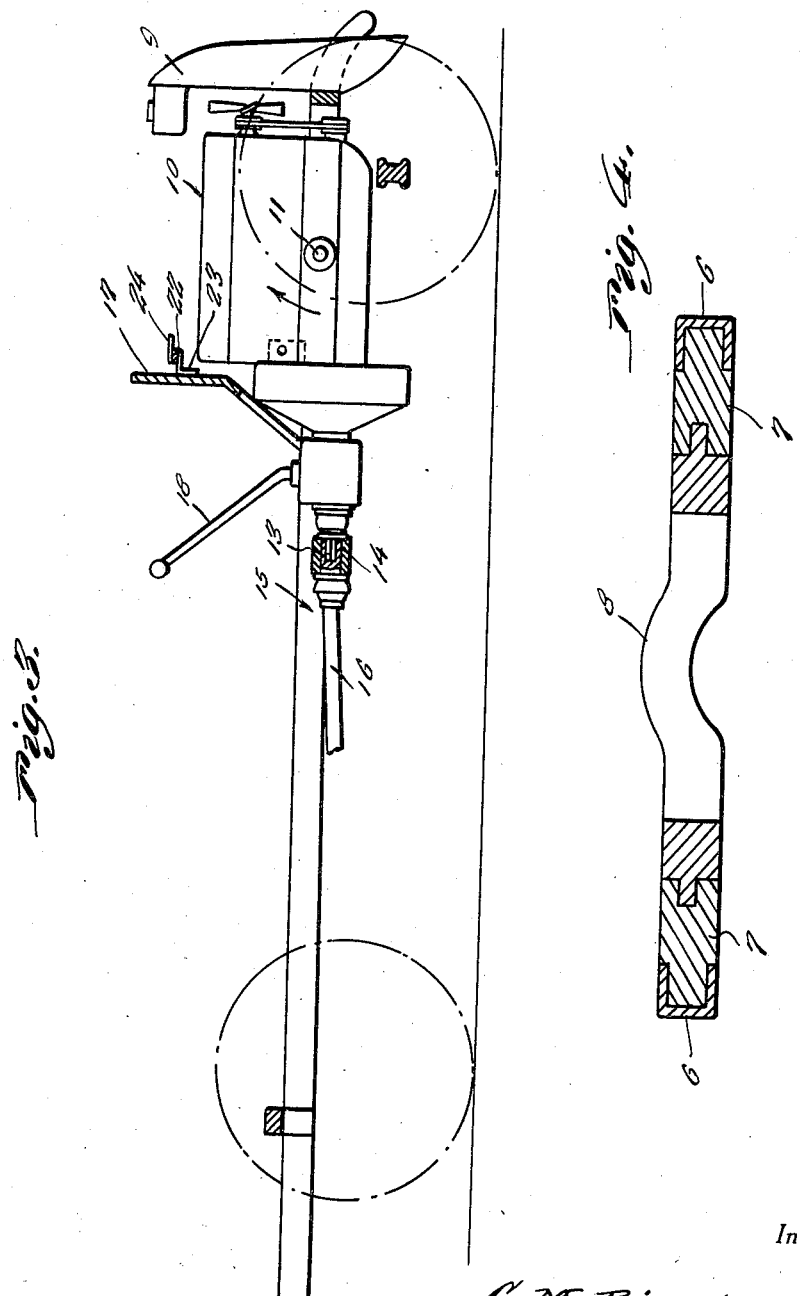
Inventor
G. M. Bicusa
By Clarence A. O'Brien
Hyman Berman
Attorneys Patented Mar. 23, 1937

2,074,533

UNITED STATES PATENT OFFICE 2,074,533

MOTOR VEHICLE CHASSIS CONSTRUCTION

George M. Bicusa, West Melrose Park, Ill.

Application September 28, 1936, Serial No. 103,044

4 Claims. (Cl. 180—64)

This invention relates to a novel wheel supported or portable chassis such as is used in the construction of present day motor vehicles, and the purpose of the invention is to provide a slidably mounted extensible and retractable supplementary motor supporting frame which may be slid to a position in advance of the main chassis frame to permit access to be had to a reversible motor cradled or hingedly suspended in said slidable frame.

There is an apparent need for a structural arrangement of this character in that it is susceptible of permitting the motor to be disconnected from the propeller shaft and then advanced to a readily accessible postion to be turned upside down to permit access to be had to the crank shaft, piston, connecting rods, and other features to facilitate making repairs. In reducing to practice the principles of the present inventive conception, I have evolved and produced what is believed to be a satisfactory and practicable arrangement permitting this result to be satisfactorily accomplished.

Other features and advatages incidental to the accomplishment of a complete and reliable result will become more readily apparent from the following description and drawings.

In the drawings, wherein like numerals are employed to designate like parts throughout the views:

Figure 1 is a top plan view of a wheel supported chassis constructed in accordance with the principles of the present inventive conception.

Figure 2 is a fragmentary top plan view showing the relatively slidable or adjustable inner frame projected or extended to motor inverting and repair position.

Figure 3 is a longitudinal sectional view taken through the frontal portion of the assemblage depicted in Figure 1.

Figure 4 is a transverse section on the line 4—4 of Figure 1.

Figure 5 is a perspective view of a multiple electric wire adapter bar found to be especially practicable and useful in an arrangement of the type under consideration.

Referring now to the drawings by distinguishing reference characters, it will be observed that the relatively fixed wheel supported channel irons constituting the main chassis construction are denoted by the numerals 6. Then as shown in Figure 4, supplementary adapter rails 7 of proper tapering design are connected with the chassis bars 6. That is to say, the extra bars 7 have portions fitting into the channels 6 and suitably and rigidly attached thereto so that the parts 7 are stationary with the channels 6. The inner longitudinal opposed edges of the adapter bars 7 are formed with grooves constituting guideways or tracks. Thus, the bars 7 may well be called tracks connected with the chassis bars 6. The relatively slidable projectible and retractable auxiliary motor carrying frame is denoted by the numeral 8 and is of general rectangular form, as depicted in Figure 2, and has at the front end thereof the ordinary radiator 9. Back of this is a regulation motor unitarily denoted by the numeral 10. In accordance with the present invention, this is fulcrumed or pivoted intermediate its ends, as indicated at the point 11 so that it is possible to turn the motor upside down to expose the crank shaft, piston rods, pistons, and other features, for inspection and repair. The transmission structure is denoted by the numeral 12 and the power transmitting shaft has a squared end 13 which fits releasably in a socket 14 forming a part of the universal joint 15 located on the adjacent end of the propeller shaft 16. This provides a slip-joint connection so that it is possible to separate the motor from the propeller shaft to extend or retract the auxiliary frame 8. The dashboard is denoted by the numeral 17 in Figure 3, and in order to extend the auxiliary frame, a screw-threaded or detachable gear shift lever 18 is employed. Thus, in projecting the frame the gear shift lever is removed so that it will not interfere with the sliding of the auxiliary frame 8. Inasmuch as the motor is fulcrumed or cradled in the auxiliary frame, it is necessary to employ suitable brackets for holding it normally level or in a fixed position. The brackets are denoted by the numerals 19 and as shown in Figure 2, are of general L-shaped construction. One end of the brackets is attached to the side bars of the adjustable frame and the other end is screwed or otherwise detachably connected with the motor. The fastenings (not shown) may be of any appropriate construction to allow the desired rocking or tilting of the motor when the fastenings are removed.

Attention is now called to an additional complementary feature of the assemblage. For example, as shown in Figure 1, the storage battery, which is supported on the main chassis, is denoted by the numeral 20. Electrically connected to the power post of the battery, as indicated at the point 21, is a horizontally disposed metal current conductor accommodation bar or strap 22. This is attached by suitable brackets 23 to the front part of the dashboard just above the battery. This bar is provided with a series of clips 24 and apertures 25 to accommodate various wires in the ignition system (not shown).

Thus, by providing this master conductor strip current can be conducted from the battery to the various wires (not shown) and the wires can quickly be disconnected from this strap or strip 22 when the extensible frame 8 is shoved in or out. In other words, it is desired to release the wires from the battery bar or strap 22 which constitutes an ideal way of expediting the use of the present invention.

Novelty is obviously predicated upon the provision of the auxiliary extensible and retractable motor carrying frame 8 with track means connecting it with the main chassis bars 6, wherein the motor is fulcrumed for pivoting or cradling action in the frame. Thus, when the frame is extended as shown in Figure 2, and the connections 19 are released, the motor can be turned upside down for repair purposes. Complementary novelty is attached to the detachable gear shift lever permitting this result to be accomplished and the battery bar or contact strip 22 permanently associated with the battery and affording releasable contacts for the motor.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, relatively stationary chassis bars, track bars carried thereby, an auxiliary frame including track members slidable in said track bars, a radiator on the frontal portion of said auxiliary frame, a motor pivotally mounted intermediate its ends inwardly of the radiator and between the side bars of said auxiliary frame, transmission means associated with the motor and including a power supply shaft, said power supply shaft having a polygonal coupling portion adapted for separable connection with a universal joint, a storage battery on the chassis frame, a dashboard, a metal conductor strap mounted on said dashboard and electrically connected with the storage battery and provided with accessories to facilitate attachment of conducting wires therewith.

2. In a structural assemblage of the class described, in combination, a wheel supported frame including a pair of spaced parallel relatively stationary chassis bars constituting a main frame, an auxiliary frame disposed in a plane with and slidably mounted between said chassis bars, a radiator on the outer frontal end portion of said auxiliary frame, a motor rockably mounted intermediate its ends between the members of said auxiliary frame and spaced inwardly from the radiator, transmission means carried by said motor and including a power transmission shaft, a complemental relatively fixed propeller shaft supported centrally between said chassis bars and provided on its forward end with a universal joint, and a slip joint connection between said transmission shaft and universal joint, whereby to provide a self-aligning quickly separable operating connection.

3. In a structural assemblage of the class described, in combination, a wheel supported main chassis frame including a pair of substantially parallel track bars, said bars being disposed on the inner sides of the chassis bars and having their opposite forward and rear ends terminating inwardly of the corresponding ends of said chassis bars, a U-shaped auxiliary frame having longitudinal rail members corresponding in length to said track bars and slidably mounted therebetween, the forward ends of the rails being directed laterally outward and having abutting connection with the adjacent front ends of said track bars, a radiator carried by the auxiliary frame, and a motor cradled in the auxiliary frame inwardly of the radiator.

4. In a structural assemblage of the class described, a wheel supported main chassis frame, an auxiliary frame slidably supported on said chassis frame, a motor cradled in said auxiliary frame, a relatively stationary dashboard, and a completely exposed readily accessible conductor strap mounted on said dashboard and provided with a plurality of selectively usable accessories to facilitate attachment of ignition means therewith.

GEORGE M. BICUSA.